May 15, 1928.
J. WALSH
1,670,089
FLOW METER
Filed Nov. 5, 1926
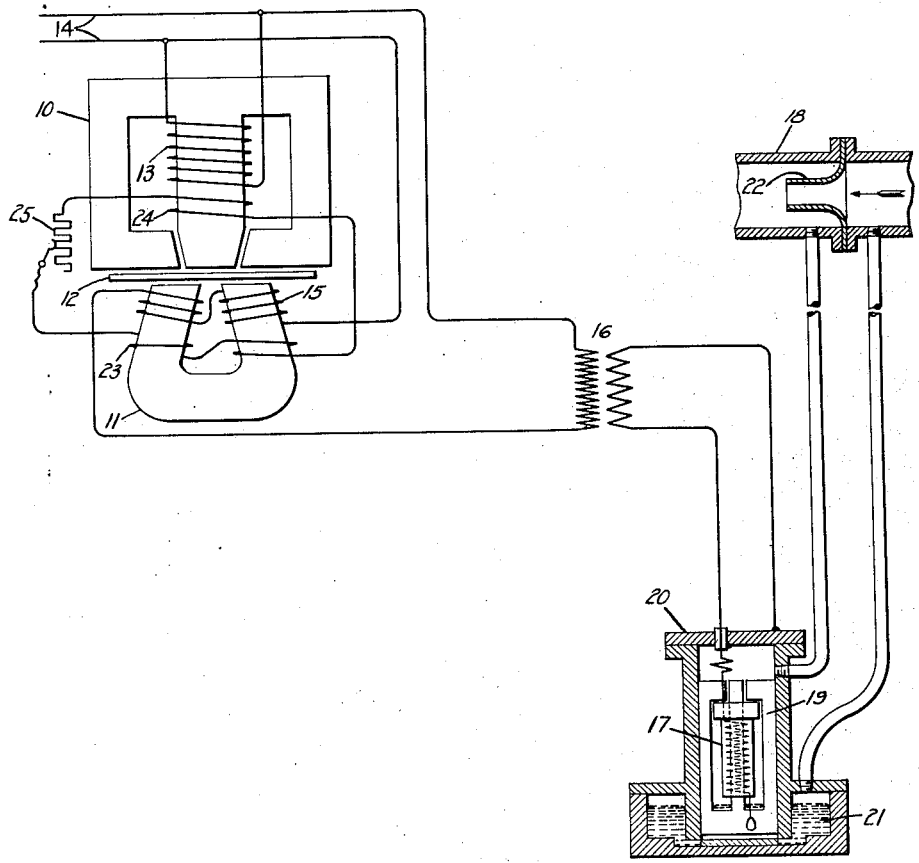
Inventor:
James Walsh,
by
His Attorney.

Patented May 15, 1928.

1,670,089

UNITED STATES PATENT OFFICE.

JAMES WALSH, OF SWAMPSCOTT, MASSACHUSETTS, ASSIGNOR TO GENERAL ELECTRIC COMPANY, A CORPORATION OF NEW YORK.

FLOW METER.

Application filed November 5, 1926. Serial No. 146,481.

My invention relates to electric meters and in particular to an improved compensating means for such meters. In some types of electric meters it is customary to provide a compensating coil to compensate for some error or condition which without compensation would produce an error in the meter reading. The magnitude of such compensation is comparatively small. It has been the practice in the past to energize such coils from the circuit to which the meter is connected and reduce the current flowing in the compensating coil by inserting a high resistance in series therewith. The value of the series resistance is of necessity much greater than that of the resistance of the compensating coil and occasions an appreciable waste of energy and requires extra connections in the meter.

In accordance with my invention I avoid these disadvantages by exciting the compensating circuit at a low voltage which is derived from another of the meter circuits. Where the meter has a potential coil I preferably use it as the primary coil of a transformer for supplying the necessary compensating energy.

The features of my invention which are believed to be novel and patentable will be pointed out in the claims appended hereto. For a better understanding of my invention reference is made in the following description to the accompanying drawing illustrating the application of my invention to an electric flow meter installation to which it is especially suited.

Referring to the drawing I have represented an electric flow meter installation of the general character described in Patent 1,560,951. The electric meter is of the wattmeter type having a potential magnet 10, a current magnet 11, and a rotatable induction disc 12. The potential and current fluxes cooperate to produce a torque on the disc proportional to the product of voltage and current. If the meter is of the integrating type it will have damping means, not shown. The potential coil 13 is connected across an alternating current source 14. The current coil 15 is connected across the source through the primary of a transformer 16. The secondary of transformer 16 is connected to supply the primary circuit of a flow meter transformer 17, the purpose of which is to vary the current in the current coil of the meter in accordance with the rate of flow of fluid in a conduit 18. The secondary of transformer 17 comprises a liquid short circuit such as mercury which varies in resistance from infinity to a low value, depending upon the rate of flow in conduit 18. The primary circuit of transformer 17 is completed through the core structure 19 and metallic chamber 20 in which it is contained. The base of this chamber contains a quantity of mercury 21 normally just below the level where it forms a short circuit secondary turn of the transformer. The conduit 18 contains a nozzle 22 for creating a pressure difference on its two sides and this pressure difference is conveyed to the chamber 20 in a manner to cause the mercury 21 to rise in the central portion of the chamber and surround the central core member of the transformer, thereby producing a secondary short circuit which varies in resistance inversely as the rate of flow in conduit 18. The primary coil of the mercury transformer is suitably insulated from the mercury. The arrangement is such that the secondary current of transformer 16 is proportional to the rate of flow in conduit 18. The current in the primary of transformer 16 and through the main current coils of the meter is only approximately proportional to the rate of flow in conduit 18 because of the fact that the transformer 16 takes exciting current even when no flow exists in conduit 18. To compensate for this exciting current and make the meter torque directly proportional to the rate of flow, a compensating winding 23 is provided on the current core arranged to oppose that portion of the flux of winding 15 which is due to the no load exciting current of transformer 16. Ordinarily this compensating winding has been excited directly from the source 14. In accordance with my invention it is excited from a coil 24 on the potential core which serves as the secondary of a transformer of which the main potential coil 13 is the primary. For example, I have found that with a 108 volt source at 14 and a main potential coil 13 having 1625 turns, a 15-turn secondary winding at 24 will give about one volt which is sufficient to energize the compensating winding. The resistance shown at 25 is merely a very low adjusting resistance constituting only a fraction of the resistance formerly used in the compensating circuit. The energy required for the new compensating circuit is only a fraction of that previously wasted in the external resistance alone. The meter requires four circuit terminals as compared to six with the previous arrangement. The number of turns on the compensating winding are also less than that previously required. The compensating current, like the exciting current of transformer 16, varies with the voltage of source 14 and the phase angles of the currents in coils 15 and 23 are such that their fluxes oppose each other. Instead of a separate coil 24 on the potential magnet I might tap the main potential coil and use it as an auto-transformer for supplying the compensating circuit.

In accordance with the provisions of the patent statutes I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. An alternating current electric meter having a potential core and coil and a current core and coil, a secondary winding on said potential core, and a compensating winding for said meter on said current core energized from said secondary winding, said compensating winding producing a flux in opposition to the flux produced by said current coil.

2. An alternating current meter of the wattmeter type having separate potential and current electromagnets, a secondary winding on said potential electromagnet and a compensating winding on said current electromagnet energized from said secondary winding.

3. An electric meter of the wattmeter type having a potential electromagnet and a current electromagnet, a source of alternating current for energizing both of said electromagnets, a transformer having its primary winding connected in series with the energizing winding of said current electromagnet across said source, and means for compensating said meter for the no-load current flowing in the energizing winding of said current electromagnet comprising a compensating coil on said current electromagnet, said compensating coil being excited from said potential electromagnet used as a transformer.

In witness whereof, I have hereunto set my hand this 29th day of October, 1926.

JAMES WALSH.